2,904,596
PRODUCTION OF TERTIARY ACETYLENIC ALCOHOLS

Richard Norman Lacey and Hubert Jowitt, Hull, England, assignors to The Distillers Company Limited, Edinburgh, Scotland, a British company No Drawing. Application September 16, 1957
Serial No. 683,935

Claims priority, application Great Britain
September 29, 1956

5 Claims. (Cl. 260—638)

The present invention relates to the production of acetylenic alcohols and in particular to the production of tertiary acetylenic alcohols by the ethynylation of ketones.

It is known that acetylenic alcohols may be prepared by reacting acetylene with ketones in the presence of alkali metal alkoxides as condensing agents. The alkoxides used hitherto have been derivatives of monoalkyl ethers of mono- or poly-alkylene glycols or derivatives of aliphatic alkanols containing only one oxygen atom in the molecule such as ethanol, butanols, iso-amyl alcohol and cyclohexanol. The alkoxides are conveniently prepared by the action of alkali metal hydroxides on the corresponding alcohols. However, when these known alkoxide condensing agents are used in the ethynylation of ketones, it is necessary to ensure that they are free from any excess of the corresponding alcohol if good yields of the desired products are to be obtained.

It is an object of the invention to provide an improved process for the production of tertiary acetylenic alcohols.

According to the present invention, the process for the production of tertiary acetylenic alcohols comprises reacting acetylene with ketone under substantially anhydrous conditions and in the presence of an alkali metal alkoxyethoxide having the structural formula

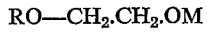

wherein R represents an alkyl group containing from one to six carbon atoms and M represents an atom of an alkali metal, in solution in an alkoxyethanol having the structural formula

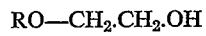

wherein R represents an alkyl group containing from one to six carbon atoms, to form the alkali metal derivative of a tertiary acetylenic alcohol and thereafter recovering the tertiary acetylenic alcohol from its alkali metal derivative.

Examples of ketones which may be used in the process of the invention include acetone, methyl ethyl ketone, methyl propyl ketone, diethyl ketone, methyl amyl ketone, di-isopropyl ketone, cyclohexanone and methylheptenone.

Preferably, the alkoxyethoxide condensing agent used in the process is in the form of a solution in the corresponding alkoxyethanol. The use of one and the same alkoxyethanol in preparing the alkoxyethoxide condensing agent and as the solvent for the alkoxyethoxide so prepared is convenient and simplifies the procedure necessary for isolating the desired product. The quantity of alkoxyethanol present in the solution may suitably be arranged to represent an excess of about 150 to 160% over that required to produce the quantity of alkoxyethoxide present from the corresponding alkali metal hydroxide.

The alkoxyethoxide solution may be prepared, for example, by adding an aqueous solution of an alkali metal hydroxide to an excess of the alkoxyethanol at a sub-atmospheric pressure, the alkoxyethoxide being maintained at boiling point, and then removing the water present by distillation using a hydrocarbon such as benzene or toluene as entrainer. The alkoxyethoxides may, however, be prepared by any suitable known method. Preferably the condensing agent used is a n-butoxyethoxide, such as potassium n-butoxyethoxide, in solution in the corresponding alcohol.

The process of the present invention may be carried out by adding acetylene to a solution of the alkoxyethoxide in the alkoxyethanol and then adding the ketone to the mixture. Preferably the acetylene feed is continued while addition of the ketone is being made. Alternatively, the process may be operated by adding the ketone to the alkoxyethoxide solution and then passing the acetylene into the mixture.

The process of the present invention, or any of the several stages of the process, may be carried out batchwise or in a continuous manner by any suitable method.

Ethynylation of the ketone in the presence of the alkali metal alkoxyethoxide results in the formation of the corresponding alkali metal derivative of a tertiary acetylenic alcohol. The tertiary acetylenic alcohol may be liberated from this by any suitable method. The free acetylenic alcohol may, for instance, be isolated after adding water to the alkali metal derivative, by extraction with a solvent at a comparatively low temperature, and subsequent recovery of the free alcohol from the solvent. In another embodiment of the invention, the alkali metal derivative of the tertiary acetylenic alcohol may be hydrolyzed and treated with carbon dioxide and the alkali metal carbonate removed before the solvent extraction is carried out. In a further embodiment of the invention, the tertiary acetylenic alcohol may be isolated from the alkali metal derivative produced by adding water to the derivative, and, after removal or neutralization of the free alkali metal hydroxide present, the mixture may then be distilled so as to isolate the free acetylenic alcohol.

The tertiary acetylenic alcohol may also be isolated from the crude product containing the alkali metal derivative of the desired tertiary acetylenic alcohol by washing with water, converting the alkali metal derivative to the corresponding tertiary acetylenic alcohol and neutralizing the alkali metal hydroxide so formed before the mixture is distilled. This method is particularly suitable if the crude product obtained from the ethynylation reaction is heterogeneous and consists of an organic phase containing the tertiary acetylenic alcohol, most of the alkoxyethanol and some of the alkali metal hydroxide corresponding to the alkoxyethoxide used as condensing agent and an aqueous phase containing most of the alkali metal hydroxide and a small quantity of the alkoxyethanol; after separation of the aqueous phase, the organic phase may be washed with water and then neutralized and distilled. The alkali metal hydroxide and alkoxyethanol, may if desired, be recovered and used to prepare the alkoxyethoxide condensing agent for the ethynylation of a further quantity of ketone.

In a particular embodiment of the invention where the ketone used in the ethynylation reaction is a ketone having a comparatively low molecular weight, such as acetone or methyl ethyl ketone, the tertiary acetylenic alcohol may be isolated from its alkali metal derivative without having to remove most of the free alkali metal hydroxide present. This is effected by distilling the crude product of the ethynylation reaction, after adding water at a sub-atmospheric pressure such that the distillation can be carried out at a temperature not higher than 60° C. Preferably the distillation is carried out at a pressure in the range from 100 to 150 millimetres of mercury. The tertiary acetylenic alcohol so obtained as distillate may then be further purified. The alkali metal hydroxide and alkoxyethanol, present together with water in the residue, may be recovered and used to prepare the alkoxyethoxide condensing agent for the ethynylation of more ketone. Such a distillation may conveniently be operated as a continuous process.

Although various proportions as acetylene, ketone and alkoxyethoxide may be used in the process of the invention, it is preferred to arrange to have these proportions such that, during the condensation reaction, the ketone is never present in the reaction mixture in an excess over the alkoxyethoxide present. Suitably, the molar ratio of ketone to alkoxyethoxide is within the range from 0.30:1 to 0.95:1 and is preferably about 0.75:1.

The condensation of acetylene and the ketone may be carried out at any temperature within a wide range but is suitably effected at a temperature below about 60° C.; the preferred range of temperature is from about 0° to 30° C. The condensation may be carried out at atmospheric pressure or at a superatmospheric pressure.

Tertiary acetylenic alcohols are known compounds having a wide variety of uses. Derivatives of the lower tertiary acetylenic alcohols are used as surface active agents, while methyl pentynol has hypnotic and sedative properties. Higher tertiary acetylenic alcohols are of use in the syntheses of other commercially important materials such as perfumery intermediates.

The following examples are given to illustrate the process of the invention. Parts by weight shown therein bear the same relation to parts by volume as do kilograms to litres. Percentages except where otherwise stated are by weight.

Example 1

196 parts by weight of a 48.8% aqueous solution of potassium hydroxide were added over a period of 6¼ hours to 531 parts by weight of n-butoxyethanol in the presence of 3.8% toluene, while agitating the mixture and maintaining it at the boiling point under reflux at a pressure of 170 millimetres. Water was then removed by entrainment with the toluene using a fractionating column of approximately 8 theoretical plates and decanting at a decanter head. When water had ceased to form a separate layer in the decanter, toluene and any residual water were distilled off. The residue, which was a 48% solution of potassium n-butoxyethoxide in n-butoxyethanol containing 250 parts by weight of the butoxyethoxide, was then cooled.

Dry acetylene was metered through 502.7 parts by weight of this solution with agitation at a temperature of 0° C. When absorption of the acetylene had ceased, 65.7 parts by weight of acetone were fed in continuously over a period of 4 hours, while continuing the acetylene feed and maintaining a slight molar excess of acetylene in the solution. Addition of the dry acetylene to the solution was continued until absorption had ceased; 32.7 parts by weight of the acetylene had then been absorbed. The solution was then hydrolyzed with 120 parts by weight of water.

The organic phase which separated from the crude product of the ethynylation reaction (665.2 parts by weight) was washed with water and then fed continuously, together with the aqueous phase (53.5 parts by weight), into a distillation column at a feed point about two thirds up the length of the column, in which n-butoxyethanol/water azeotrope was boiling under reflux at 105 millimetres' pressure. The distillate taken off at the head of the column at 44° C. contained 5.0 parts by weight of acetone and 78.0 parts by weight of 2-methylbut-3-yn-2-ol. The total conversion of acetone was 92.4% and the yield of 2-methylbut-3-yn-2-ol was 88.9% of the theoretical yield. n-Butoxyethanol, potassium hydroxide and water were removed as residue from the base of the column and recovered for use in preparing potassium n-butoxyethoxide for use in ethynylating more acetone.

The distillate from the column was redistilled to give first a low-boiling fraction containing acetone and then the 2-methylbut-3-yn-2-ol/water azeotrope having a boiling point of 90° C. at 771 millimetres pressure and containing 68.6% 2-methylbut-3-yn-2-ol. Dry 2-methylbut-3-yn-2-ol of 99.9% purity was obtained by distillation of the azeotrope using benzene as entrainer to remove the water.

Example 2

469.5 parts by weight of the residue removed from the base of the column in which the crude ethynylation product was distilled as described in the preceding example contained 60 parts by weight of potassium hydroxide, 400 parts by weight of n-butoxyethanol, and water. To this was added 131 parts by weight of n-butoxyethanol and the mixture was distilled under reflux with 20 parts by weight of toluene until all the water present had been removed. 35.3 parts by weight of potassium hydroxide were then added as an aqueous solution and the mixture was then treated as described in the preceding example to give 566 parts by weight of a 44% solution of potassium n-butoxyethoxide.

This solution was used to ethynylate 66.3 parts by weight of acetone using the method described in Example 1. After hydrolysis the whole product was fed into a distillation column in which n-butoxyethanol/water azeotrope was boiling under reflux at 118 millimetres' pressure, the feed being introduced at about the mid-point of the column. The distillate obtained at a boiling point of 50° C. was collected and contained 7.8 parts by weight of acetone and 77.2 parts by weight of 2-methylbut-3-yn-2-ol. The total conversion of acetone was 88.1% and the yield of 2-methylbut-3-yn-2-ol was 91.6% of the theoretical yield.

Redistillation of the distillate using the method described in Example 1 gave a product of 2-methylbut-3-yn-2-ol of 99.3% purity in a yield of 61% of the theoretical yield based on the acetone. A further quantity of 2-methylbut-3-yn-2-ol in a yield of 26.5% of the theoretical yield was distributed between lower and higher boiling fractions.

Example 3

196 parts by weight of a 48.8% aqueous solution of potassium hydroxide were added over a period of 4¼ hours to 532 parts by weight of n-butoxyethanol in the presence of 3.8% toluene, while agitating the mixture and maintaining it at the boiling point under reflux at a pressure of 170 millimetres. Water was then removed by entrainment with toluene as described in Example 1. The toluene and any residual water were then distilled off and the residual 46.1% solution of potassium n-butoxyethoxide in n-butoxyethanol contained 262 parts by weight of the alkoxide.

Dry acetylene was passed through 531 parts by weight of this solution containing 245 parts by weight of potassium n-butoxyethoxide with agitation at a temperature of 0° C. When absorption of the acetylene had ceased, 78.6 parts by weight of methyl ethyl ketone were fed in continuously over a period of 3¼ hours while continuing the acetylene feed and maintaining a slight molar excess of acetylene in the solution. Addition of the acetylene was continued until absorption ceased, 33.0 parts by weight of acetylene thus being absorbed over a period of 4¾ hours.

The solution was then hydrolyzed with 120 parts by weight of water and fed continuously over a period of 4¼ hours into a distillation column, in which n-butoxyethanol/water azeotrope was boiling under reflux at 107 millimetres' pressure, at a point one-third of the way down the column. A heterogeneous distillate was obtained at the head of the column boiling at a temperature of 52° C., from which the organic phase was decanted; the aqueous phase was returned continuously as reflux to the column. 224 parts by weight of the distillate were collected, containing 6.5 parts by weight of methyl ethyl ketone and 94 parts by weight of 3-methylpent-1-yn-3-ol. The total conversion of the methyl ethyl ketone was 91.7% and the yield of 3-methylpent-1-yn-3-ol was 96% of the theoretical yield.

Redistillation of the distillate was carried out at atmospheric pressure and the following fractions were obtained:

(i) Methyl ethyl ketone azeotrope.
(ii) The heterogeneous 3-methylpent-1-yn-3-ol azeotrope (used for the removal of water).
(iii) An intermediate fraction (boiling point range from 88° to 121° C.).
(iv) The dry 3-methylpent-1-yn-3-ol fraction of 99.9% purity.

*Example 4*

The residues removed from the base of the distillation column in which the ethynylation product was distilled as described in the preceding example, were used to prepare a solution of potassium n-butoxyethoxide in n-butoxyethanol as described in Example 2. The solution, which contained 247 parts by weight of potassium n-butoxyethoxide as a 47% solution in the corresponding alcohol, was used as condensing agent in the ethynylation of 79.2 parts by weight of methyl ethyl ketone at a temperature of 0° C. and the tertiary acetylenic alcohol produced was isolated using the methods described in the preceding example.

The total conversion of methyl ethyl ketone was 86% and a 97% yield of 3-methylpent-1-yn-3-ol was obtained.

*Example 5*

A solution of potassium n-butoxyethoxide containing 242 parts by weight of the alkoxyethoxide as a 45.3% solution in n-butoxyethanol was prepared as described in Example 4. This solution was then used in the ethynylation of 82 parts by weight of methyl ethyl ketone carried out as described in Example 3 except that a temperature of 15° C. was used for the condensation.

After hydrolyzing and distilling the condensation product, 14.2 parts by weight of methyl ethyl ketone were recovered and 90.9 parts by weight of 3-methylpent-1-yn-3-ol were obtained. The total conversion of ketone was thus 82.7% and the yield of 3-methylpent-1-yn-3-ol was 98.7% of the theoretical yield.

*Example 6*

244 parts by weight of potassium hydroxide were added as a 48.1% aqueous solution over a period of 9½ hours to 1,416 parts by weight of n-butoxyethanol and 50 parts by weight of toluene in a reactor, the mixture being agitated continuously and maintained at the boiling point under reflux at a pressure of 172 millimetres. The agitation was effected by feeding nitrogen gas to the base of the reactor. Water was removed from the mixture by entrainment with the toluene at a decanter head. Toluene was then removed by distillation and the residue product of potassium n-butoxyethoxide in n-butoxyethanol was used in the ethynylation of 6-methylhept-5-ene-2-one.

Acetylene was metered through 1,509 parts by weight of the solution, containing 670 parts by weight of the potassium n-butoxyethoxide, with agitation at a temperature of 0° C. When absorption of acetylene had ceased, 398 parts by weight of 6-methylhept-5-ene-2-one were fed in during a period of 7 hours. The acetylene feed was continued until no further absorption occurred and 350 parts by weight of water were then added to effect hydrolysis.

The aqueous phase was removed from the heterogeneous crude reaction product and the organic phase was washed with three successive amounts of water each of 250 parts by weight. The organic phase was then neutralized with sulphuric acid to litmus and distilled. 353 parts by weight of dehydrolinalool were obtained in 99% purity having a boiling point range of 64° to 67° C. at 3 millimetres' pressure.

*Example 7*

120 parts by weight of 6-methylhept-5-ene-2-one were ethynylated at a temperature of 15° C. using 547 parts by weight of a 44% solution of potassium n-butoxyethoxide in n-butoxyethanol as described in the previous example.

After the hydrolysis, washing, neutralization and distillation operations had been carried out, a fraction consisting of 119.7 parts by weight of dehydrolinalool of 98% purity was obtained. This amount together with dehydrolinalool obtained in lower and higher boiling fractions, represented a yield of 90.2% of the theoretical yield based on 6-methylhept-5-ene-2-one.

*Example 8*

539 parts by weight of a 47.2% solution of potassium n-butoxyethoxide in n-butoxyethanol were prepared and used to ethynylate 85.8 parts by weight of methyl ethyl ketone as described in Example 1 except that a temperature of 50° C. was employed.

After hydrolysis and isolation of the desired product had been carried out, 45.0 parts by weight of 3-methylpent-1-yn-3-ol were obtained, in a yield of 86% of the theoretical yield. 47.0 parts by weight of methyl ethyl ketone were recovered.

*Example 9*

564.7 parts by weight of a 40% solution of potassium n-propoxyethoxide in n-propoxyethanol were prepared and used to ethynylate 75 parts by weight of methyl ethyl ketone as described in Example 1; a temperature of 0° C. was employed.

After hydrolyzing with 120 parts by weight of water, the resulting solution was fed into a column, in which the azeotrope of n-propoxyethanol with water was boiling under reflux at 100 millimetres of mercury pressure, at a point one-third of the way down the column. A heterogeneous azeotrope was obtained at the head of the column at a temperature of 48° C. and allowed to settle into two layers. The non-aqueous phase was decanted off and the aqueous phase was returned as reflux to the column.

From 152.3 parts by weight of the distillate, 41.6 parts by weight of 3-methylpent-1-yn-3-ol were obtained in a yield of 80% of the theoretical yield. 36.7 parts by weight of methyl ethyl ketone were recovered.

*Example 10*

30 parts by weight of sodium hydroxide, as a 49.6% aqueous solution, were added over a period of 3 hours to a reactor containing a mixture of 236 parts by weight of n-butoxyethanol and 20 parts by weight of toluene boiling under reflux at a pressure of 175 millimetres of mercury. The mixture was agitated, while the alkali was being added, by passing a stream of nitrogen into the base of the reactor. Water was decanted from the toluene azeotrope and the solvents were then distilled to remove toluene. The base product was a 43.3% solution of sodium n-butoxyethoxide in n-butoxyethanol.

233 parts by weight of the solution so prepared, containing 96.5 parts by weight of sodium n-butoxyethoxide, were used to ethynylate 36 parts by weight of methyl ethyl ketone as described in Example 1, employing a temperature of 50° C. After hydrolysis and isolation of the desired product had been carried out, 14.8 parts by weight of 3-methylpent-1-yn-3-ol were obtained, in a yield of 43% of the theoretical yield. 11.0 parts by weight of methyl ethyl ketone were recovered, the total conversion of the methyl ethyl ketone thus being 70%.

We claim:

1. A process for the production of tertiary acetylenic alcohols which comprises reacting acetylene with a ketone under substantially anhydrous conditions and in the presence of an alkali metal alkoxyethoxide having the structural formula $$RO-CH_2.CH_2.OM$$

wherein R represents an alkyl group containing from one to six carbon atoms and M represents an atom of an alkali metal, in solution in the corresponding alkoxyethanol to form the alkali metal derivative of a tertiary acetylenic alcohol and thereafter recovering the tertiary acetylenic alcohol from its alkali metal derivative.

2. The process claimed in claim 1 wherein the alkoxyethoxide is a n-butoxyethoxide and wherein the alkoxyethanol is n-butoxyethanol.

3. The process claimed in claim 1 wherein the product obtained by reacting acetylene with the ketone consists of an organic phase containing the tertiary acetylenic alcohol, most of the alkoxyethanol and some of the alkali metal hydroxide corresponding to the alkoxyethoxide used an an aqueous phase containing the remainder of the alkoxyethanol and the remainder of the alkali metal hydroxide, and the tertiary acetylenic alcohol is recovered by removing the aqueous phase, washing and then neutralizing and distilling the organic phase.

4. A process for the production of tertiary acetylenic alcohols which comprises reacting acetylene with a ketone under substantially anhydrous conditions and in the presence of an alkali metal alkoxy ethoxide having the structural formula RO—$CH_2.CH_2$.OM wherein R represents an alkyl group containing from 1 to 6 carbon atoms and M represents an atom of an alkali metal, in solution in the corresponding alkoxy ethanol, adding water to the product and distilling the tertiary acetylenic alcohol from the resulting mixture at a temperature not higher than 60° C.

5. A continuous process for the production of tertiary acetylenic alcohols which comprises reacting acetylene with a ketone under substantially anhydrous conditions and in the presence of an alkali metal alkoxy ethoxide having the structural formula RO—$CH_2.CH_2$.OM wherein R represents an alkyl group containing from 1 to 6 carbon atoms and M represents an atom of an alkali metal, in solution in the corresponding alkoxy ethanol, adding water to the product, distilling the tertiary acetylenic alcohol from the resulting mixture at a temperature not higher than 60° C., reacting alkali metal hydroxide and the alkoxy ethanol recovered from the distillation residue to reform a solution of the alkali metal alkoxy ethoxide in the alkoxy ethanol, and reacting further acetylene and ketone in the pressure of the so-formed solution.

References Cited in the file of this patent

UNITED STATES PATENTS

| | | |
|---|---|---|
| 1,712,830 | Kyrides | May 14, 1929 |
| 2,161,191 | Perkins | June 6, 1939 |